United States Patent [19]
VanDeMoere et al.

[11] Patent Number: 5,229,808
[45] Date of Patent: Jul. 20, 1993

[54] CAMERA VIEWFINDER

[75] Inventors: Alan V. VanDeMoere, Rochester; David A. Hodder, Spencerport, both of N.Y.

[73] Assignee: Eastman Kodak Company, Rochester, N.Y.

[21] Appl. No.: 823,940

[22] Filed: Jan. 22, 1992

[51] Int. Cl.$^5$ ............................................. G03B 7/00
[52] U.S. Cl. ........................................ 354/411; 354/222
[58] Field of Search ...................... 354/411, 219–225; 356/234, 235

[56] References Cited

U.S. PATENT DOCUMENTS

| | | | |
|---|---|---|---|
| 1,255,167 | 2/1918 | Howie | 354/411 |
| 1,420,096 | 6/1922 | Hague | 354/411 |
| 1,614,672 | 1/1927 | Herz | 354/411 |
| 1,721,411 | 7/1929 | Ramsey | 354/411 |
| 2,066,605 | 1/1937 | Billing | 354/411 |
| 2,219,300 | 10/1940 | Edmunds | 354/411 |
| 2,273,429 | 2/1942 | Bing | 354/411 |
| 2,321,420 | 6/1943 | Rath | 354/411 |
| 2,350,237 | 5/1944 | Kende et al. | 354/411 |
| 3,429,243 | 2/1969 | Boyle, Jr. | 354/411 |
| 3,760,700 | 9/1973 | Trankner et al. | 354/411 |
| 4,474,441 | 10/1984 | Millard | 354/413 |

*Primary Examiner*—Michael L. Gellner
*Assistant Examiner*—Howard B. Blankenship
*Attorney, Agent, or Firm*—Roger A. Fields

[57] ABSTRACT

In a photographic camera, a neutral density or other light reducing filter in the viewfinder obscures details of a subject viewed through the viewfinder in low light to provide a warning that ambient light is insufficient for a proper daylight exposure. The filter has little or no light reducing capability at a central portion and along a peripheral portion to serve as aiming and framing features, respectively.

7 Claims, 4 Drawing Sheets

CAMERA VIEWFINDER

CROSS-REFERENCE TO A RELATED APPLICATION

Reference is made to commonly assigned copending application Ser. No. 07/823,951 entitled CAMERA VIEWFINDER and filed Jan. 22, 1992 in the name of Alan V. VanDeMoere.

BACKGROUND OF THE INVENTION

1. Field of the Invention

The invention relates generally to the field of photography, and in particular to a camera viewfinder. More specifically, the invention relates to a camera viewfinder in which a neutral density or other light reducing filter obscures details of a subject viewed through the viewfinder in low light to provide a warning that ambient light is insufficient for a proper daylight exposure.

2. Description of the Prior Art

When taking a picture it is necessary to know not only in what direction to aim the camera but also how much of the subject will be included in the picture. For this reason practically every camera has a viewfinder of some kind.

Typical prior art U.S. Pat. No. 1,255,167, issued Feb. 5, 1918, discloses a viewfinder with a disk that is rotatable to bring respective openings in the disk successively into registration with a front lens of the viewfinder. Some of the openings are covered by different color light retarding materials to change the amount of ambient light that can enter the viewfinder through the front lens, and they have corresponding notations indicating recommended times of exposure. In operation, the disk is manually rotated until the opening in registration with the front lens makes the subject viewed through the viewfinder appear somewhat faint. Then, the associated time of exposure is selected. If, however, the subject is too faint, the associated time of exposure is too short. A problem with the design is that it may be difficult to aim the camera at the subject and to frame the subject because the view of the subject through the viewfinder is made faint.

SUMMARY OF THE INVENTION

According to one aspect of the invention there is provided a camera viewfinder for viewing a subject to be photographed, which comprises light-reducing filter means arranged across a viewing axis of the viewfinder for making the subject appear faint when it is viewed through the viewfinder in ambient light that is insufficient for a proper daylight exposure, and which is characterized in that:

said filter means has a central portion substantially at the viewing axis of the viewfinder with little or no light reducing capability as compared to a main or surrounding portion of the filter means to permit the subject to be viewed through the central portion more readily than it can be viewed through the main portion, whereby the central portion can be used to aim at the subject.

According to another aspect of the invention the camera viewfinder is characterized further in that:

said filter means has a peripheral portion with little or no light reducing capability as compared to the main portion of the filter means to permit the subject to be viewed through the peripheral portion more readily than it can be viewed through the main portion, whereby the peripheral portion can be used to frame the subject.

DESCRIPTION OF THE PREFERRED EMBODIMENT

The invention is disclosed in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
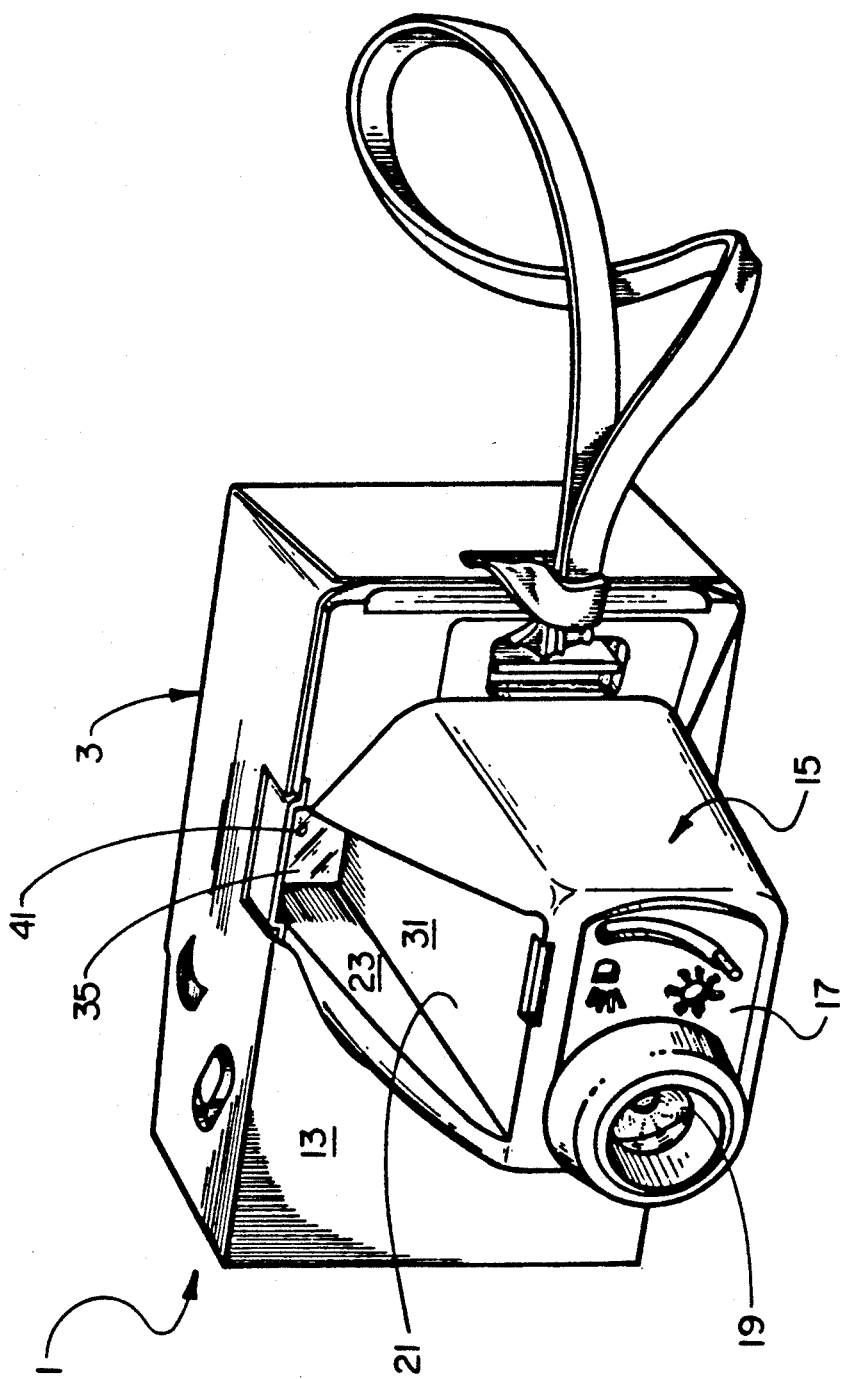
FIG. 1 is a front perspective view of a photographic camera including a viewfinder construction according to a preferred embodiment of the invention.
Figure 3:
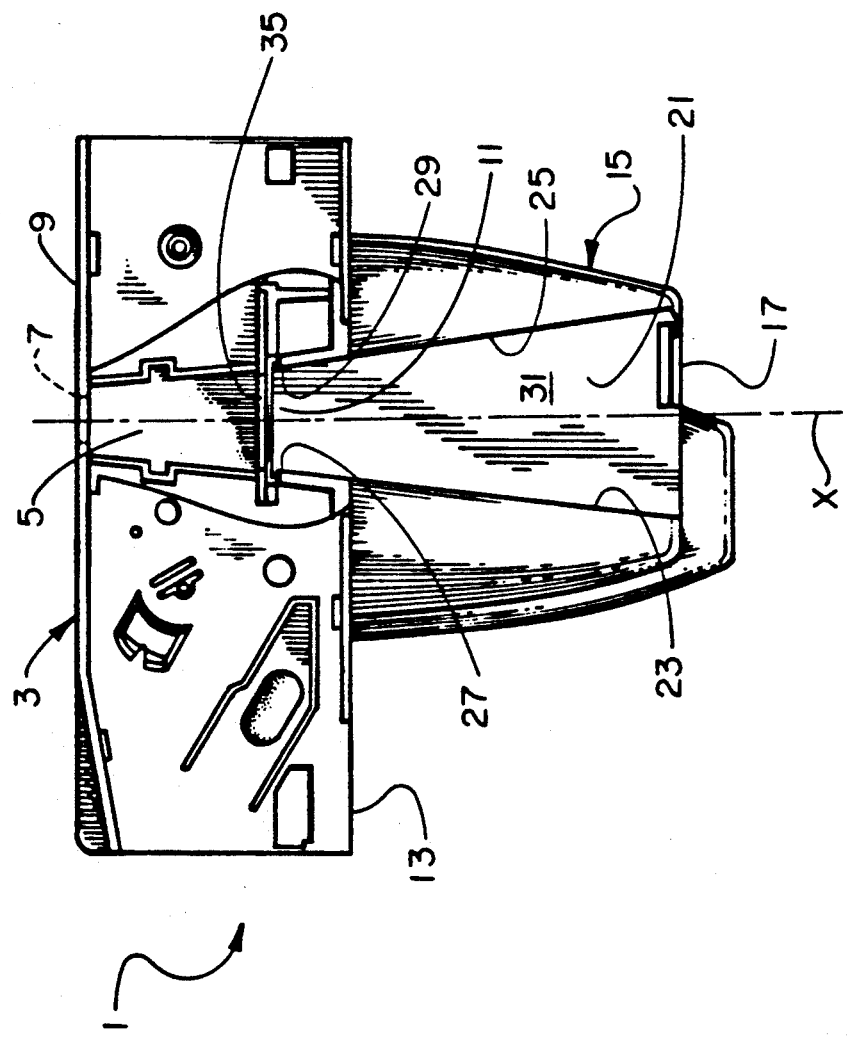
FIG. 3 is a top view of the photographic camera with part of its top cover removed to show the viewfinder construction.

Referring now to FIGS. 1 and 3 of the drawings there is shown a photographic camera 1 comprising a camera housing or body 3 which has an internal viewfinder tunnel 5 bounded by a viewing opening 7 in a rear wall 9 of the housing and a frame finder opening 11 in a front wall 13 of the housing. A taking lens extension or snout 15 projects longitudinally from the front wall 13 and has a front end or panel 17 that supports a lens element 19. Typically, when aiming the photographic camera 1 at a subject to be photographed, one places an eye at the viewing opening 7, looks through the internal viewfinder tunnel 5, and out the frame finder opening 11.

Figure 2:
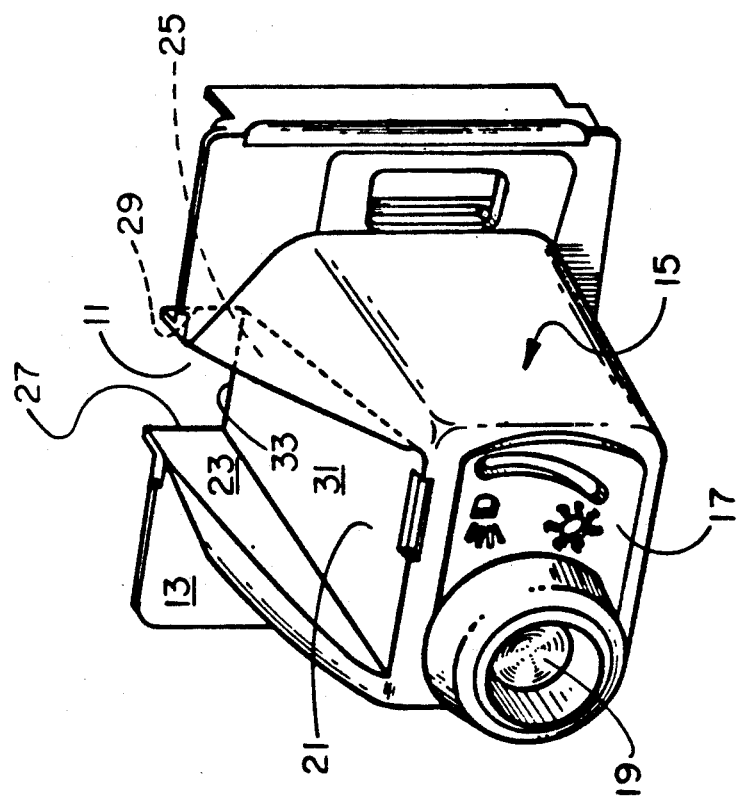
FIG. 2 is a front perspective view of an integral front wall and taking lens extension of the camera housing.

The taking lens extension 15 has a channel-like cut-out 21 substantially along its length which converges toward the frame finder opening 11 to effectively extend the viewfinder tunnel 5 to facilitate camera aiming. See FIGS. 1 and 3. The channel-like cut-out 21 is defined by a pair of upstanding spaced walls 23 and 25 of the taking lens extension 15 which converge from the front end 17 of the taking lens extension rearwardly to respective sides 27 and 29 of the frame finder opening 11. See FIG. 2. Also, the channel-like cut-out 21 is defined by a floor 31 which extends between the spaced walls 23 and 25 from the front end 17 of the taking lens extension rearwardly to a bottom 33 of the frame finder opening 11. The bottom 33 of the frame finder opening 11 lies between the two sides 27 and 29 of the frame finder opening. See FIG. 2. Other details of the channel-like cut-out 21 are provided in cross-referenced application Ser. No. 07/823,951.

A light reducing semi-transparent filter, such as a neutral density filter 35, is fixed across the frame finder opening 11 to make the subject to be photographed appear faint or obscured when the camera user views it through the viewfinder tunnel 5 in ambient light that is insufficient for a proper daylight exposure. See FIGS. 1 and 3. Specifically, if the camera user can see details of the subject, there is enough light to take an acceptable picture. Conversely, if the camera user cannot see details of the subject, the light level is too low to take a good picture. In one example, there was selected a film speed of ISO 1600, an 85 mm taking lens, an exposure aperture of f/11, and an exposure time of 1/125 second. Given an underexposure latitude of two f/stops, unacceptable pictures are expected to occur at ambient light of 12 or lower foot-lamberts. Subjective testing then led to a neutral density filter 35 with a 1.6 to 1.8 log density.

Figure 4:
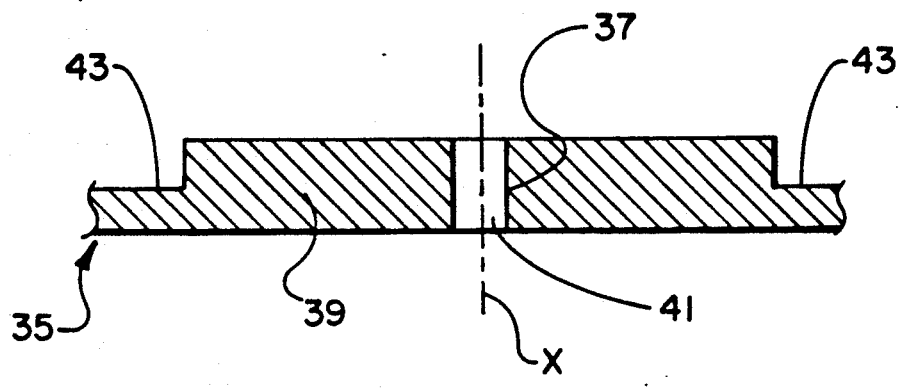
FIG. 4 is a cross-section view of a neutral density filter included in the viewfinder construction.
Figure 5:
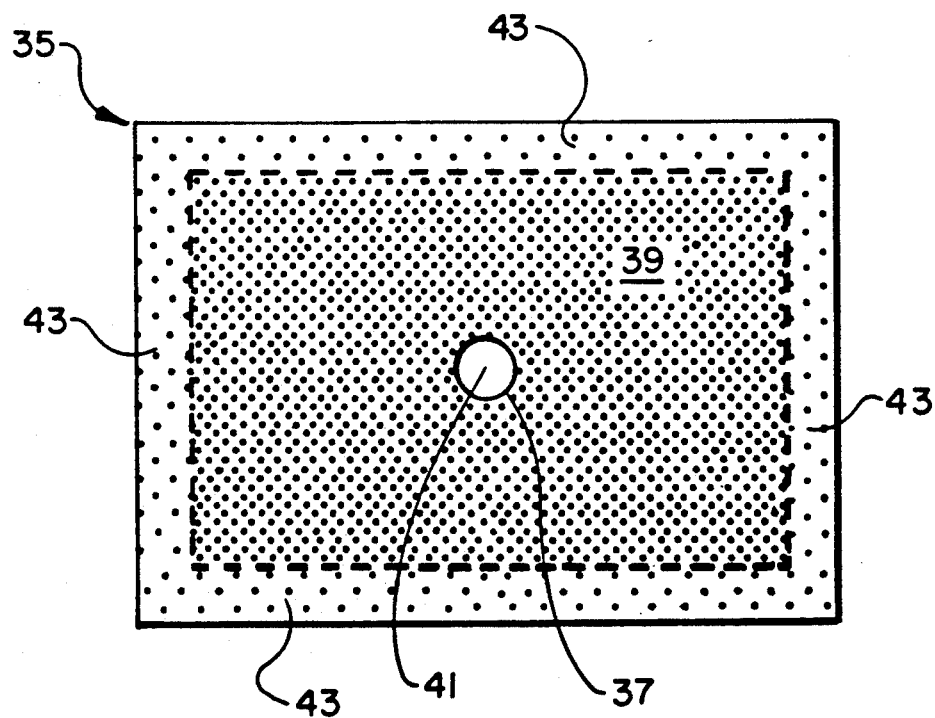
FIG. 5 is a front elevation view of the neutral density filter.

According to a first aspect of the invention, the neutral density filter 35 has a central portion 37 substantially at a viewing axis X of the viewfinder tunnel 5 with little or no light reducing capability as compared to a main or surrounding portion 39 of the filter. See FIGS. 4 and 5. This permits the subject to be viewed through the central portion 37 more readily than it can be viewed through the main or surrounding portion 39. As a result, the central portion 37 can be used as a pointing or aiming device to aim at the subject when looking through the viewfinder tunnel 5. Preferably, the central portion 37 is a round viewing hole 41 in the filter 35. Alternatively, the central portion 37 can be less thick or less dense than the main or surrounding portion 39. What is necessary to make a pointing or aiming device is that a central "bright spot" be apparent in the viewfinder tunnel 5 when looking at the subject. Also, it has been determined that the central "bright spot" can serve as a good base or reference standard for the camera user to judge if the subject appears faint when viewed through the main or surrounding portion 39. In place of the round viewing hole 41, other shapes may be employed as the aiming device. These include crosshair designs, rectangular-line designs, etc.

According to another aspect of the invention, the neutral density filter 35 has an encircling peripheral portion 43 with little (or no) light reducing capability, i.e. less thick or less dense, as compared to the main or surrounding portion 39 of the filter. See FIGS. 4 and 5. This permits the subject to be viewed through the peripheral portion 43 more readily than it can be viewed through the main or surrounding portion 39. Consequently, the peripheral portion 43 can be used to frame the subject.

The invention has been described with reference to a preferred embodiment. However, it will be appreciated that variations and modifications can be effected within the ordinary skill in the art without departing from the scope of the invention.

We claim:

1. A camera viewfinder through which a subject to be photographed is viewed, comprising a light-reducing filter arranged across a viewing axis of said viewfinder for making the subject appear faint when it is viewed through the viewfinder in ambient light that is insufficient for a proper daylight exposure, is characterized in that:

said filter has a central portion substantially at the viewing axis of said viewfinder with little or no light reducing capability as compared to a surrounding portion of the filter to permit the subject to be viewed through said central portion can more readily than it can be viewed through said surrounding portion, whereby the central portion can be used to aim at the subject.

2. A camera viewfinder as recited in claim 1, characterized further in that:

said filter has a peripheral portion with little or no light reducing capability as compared to said surrounding portion of the filter to permit the subject to be viewed through said peripheral portion more readily than it can be viewed through the surrounding portion, whereby the peripheral portion can be used to frame the subject.

3. A photographic camera recited in claim 1, wherein said filter is a neutral density filter.

4. A photographic camera as recited in claim 1, wherein said central portion of said filter includes a viewing hole for aiming at the subject.

5. A photographic camera as recited in claim 1, wherein said central portion of said filter is less thick than said surrounding portion of the filter for aiming at the subject.

6. A camera view finder through which a subject to be photographed is viewed, comprising a light-reducing filter arranged across a viewing axis of said viewfinder for making the subject appear faint when it is viewed through the viewfinder in ambient light that is insufficient for a proper daylight exposure, is characterized in that:

said filter has an encircling peripheral portion with little or no light reducing capability as compared to a main portion of the filter to permit the subject to be viewed through said peripheral portion more readily than it can be viewed through the main portion, whereby the peripheral portion can be used to frame the subject.

7. A photographic camera as recited in claim 6, wherein said peripheral portion of said filter is less thick than said main portion of the filter for framing the subject.

* * * * *